Figure 1:
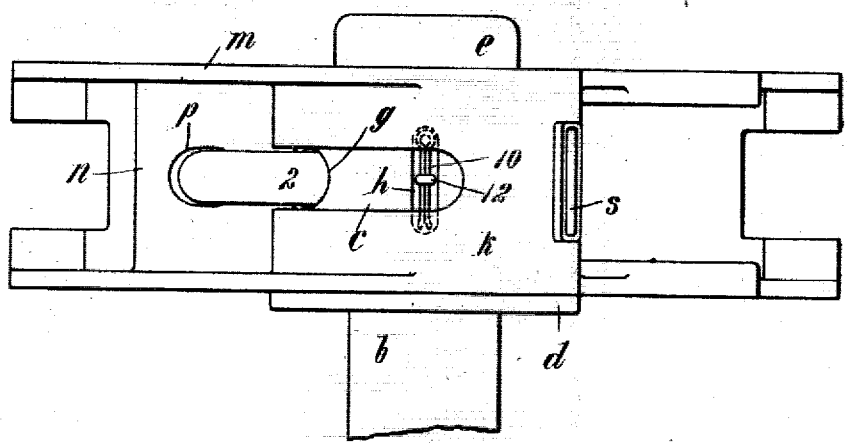

No. 824,796. PATENTED JULY 3, 1906.
J. A. LAMONT.
LOCKING DEVICE.
APPLICATION FILED JUNE 9, 1905.

2 SHEETS—SHEET 1.

Witnesses
Alex Currie
Geo. L. Sears

John A. Lamont
Inventor
By Attorney

No. 824,796. PATENTED JULY 3, 1906.
J. A. LAMONT.
LOCKING DEVICE.
APPLICATION FILED JUNE 9, 1905.
2 SHEETS—SHEET 2.
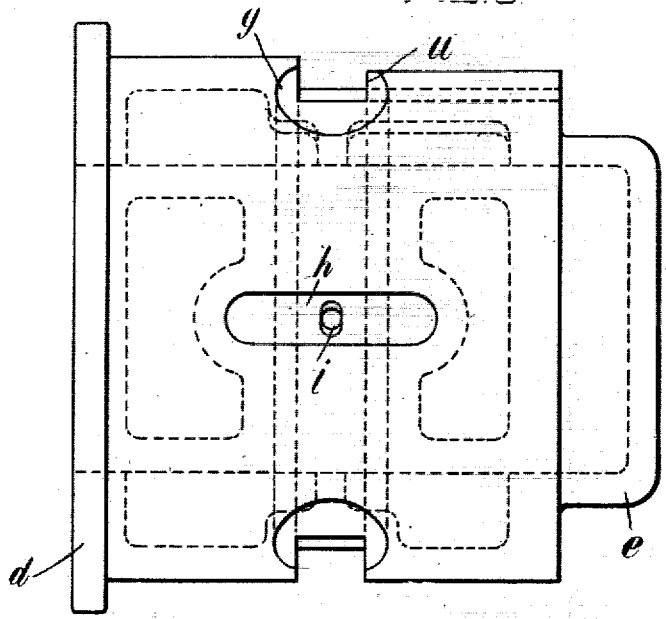
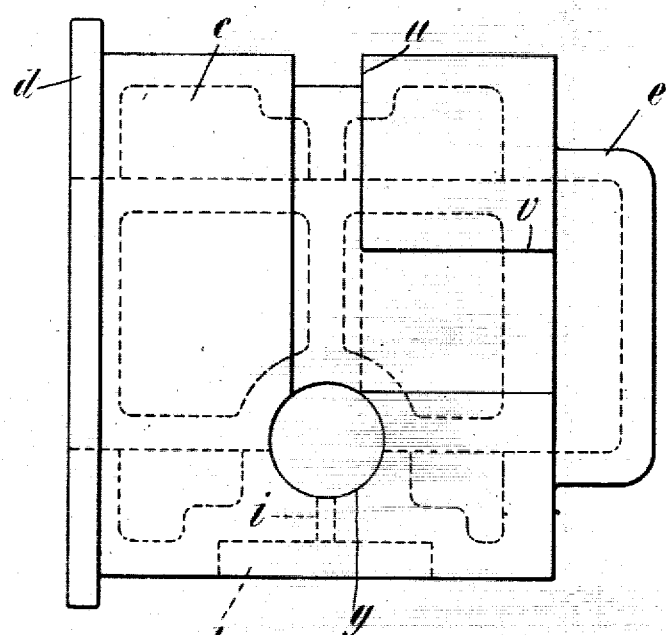

UNITED STATES PATENT OFFICE.

JOHN ALEXANDER LAMONT, OF MONTREAL, CANADA.

LOCKING DEVICE.

No. 824,796.                Specification of Letters Patent.                Patented July 3, 1906.

Application filed June 9, 1905. Serial No. 264,494.

*To all whom it may concern:*

Be it known that I, JOHN ALEXANDER LAMONT, of the city of Montreal, Province of Quebec, Canada, have invented certain new and useful Improvements in Locking Devices; and I do hereby declare that the following is a full, clear, and exact description of the same.

My invention relates particularly to the means for locking an adjustable brake-head in different angular positions upon a brake-beam, although it can be applied to advantage to means for locking other adjustable parts together.

The invention may be said briefly to consist of a locking member carried by one of the parts to be locked together, a second locking member carried by the other of such parts, a device carried permanently by one of such parts, and a movable device carried by the other part and coacting with the first-mentioned device to lock the parts in any predetermined position relatively to one another.

For full comprehension, however, of my invention reference must be had to the accompanying drawings, forming a part of this specification, in which similar reference characters indicate the same parts, and wherein—

Figure 2:
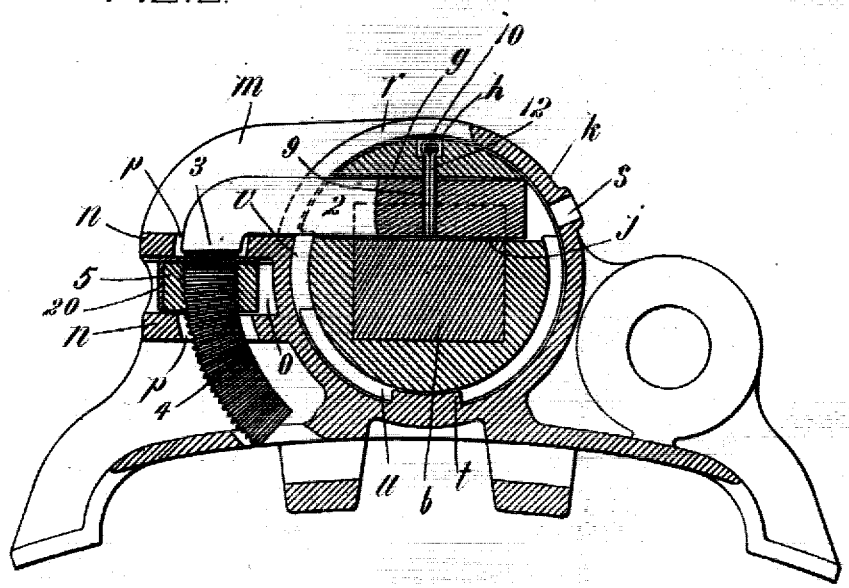

Figure 1 is a side elevation of an adjustable brake-head with my invention applied thereto. Fig. 2 is a longitudinal sectional view thereof taken at right angles to the axis of the head. Fig. 3 is a side elevation of the part carried by the brake-beam, and Fig. 4 is a similar view to Fig. 3 taken at right angles thereto.

In order to enable my invention to be clearly understood, I have illustrated the same applied to the adjustable connection of a brake-head to a brake-beam, although it can be applied with advantage to adjustably connect other parts together within the spirit of my invention.

The part carried by the brake-beam $b$ consists of a sleeve $c$, cast with a circumferential flange $d$ at one end and its opposite end exteriorly diminished, as at $e$, while the interior thereof is of rectangular cross-section to fit upon the end $f$ of the brake-beam. The body of this sleeve is cored out to present a hole $g$, extending eccentrically therethrough in a radial plane about midway of the length thereof, and an axial recess $h$ in its perimeter, with a pin-hole $i$ extending therefrom into intersection with the hole $g$. The brake-beam is formed with a half-round recess $j$ in one side, which is adapted to come into juxtaposition with the hole $g$ when the sleeve is fitted upon the beam.

The brake-head is in the main of usual construction. It is cast with a cylindrical portion $k$ and a pair of webs $m$, between which and at right angles thereto a second pair of webs $n$ extend, thus forming a chamber $o$ to accommodate a nut 5, hereinafter further alluded to. Each of the webs $n$ is perforated, as at $p$, and the portion of the wall of the cylindrical portion $k$ contiguous to one side of the chamber $o$ is circumferentially slotted, as at $r$, from such chamber and about forty-five per cent. in length, while adjacent to the end of this circumferential slot is an axial slot $s$, and a key $t$ upon the interior of the brake-head is adapted to enter a circumferential recess $u$ in the perimeter of the sleeve through an axial recess $v$ leading thereto for the purpose of preventing accidental axial displacement of the head.

The sleeve is locked upon the brake-beam and the brake-head in different angular positions relatively to the sleeve by means of a hook and the nut 5, before mentioned, the hook having a straight portion 2 and a portion 3 curved with a slightly greater radius than the cylindrical portion of the brake-head and formed with a screw-thread 4, mutilated or cut away along the radial inner side thereof. The nut 5 is of usual standard make, and, as before mentioned, is accommodated in the chamber $o$, and the straight portion of the hook has a pin-hole 9 therein.

In assembling the parts above described the sleeve $c$ is first slipped upon the end of the brake-beam and the recess $j$ caused to register with the hole $g$. The brake-head, held with the key $t$ in line with the recess $v$, is then pushed onto the sleeve, which will cause the slot $s$ to coincide with the recess $h$. The straight portion 2 of the hook is then inserted into the coinciding hole $g$ and recess $j$ until the curved portion of the hook assumes a position concentric to the cylindrical portion of the brake-head, which will position it in circumferential line with the perforations $p$ in the walls of the nut-chamber $o$. A split cotter-pin 10 is then inserted into the eye of a second split cotter-pin 12, which is then inserted through the axial slot $s$ into the recess $h$, pin-hole $i$, and the pin-hole 9, the cotter-pin 10 accompanying it as far as the recess $h$, in which it is embedded. The nut is then held in its chamber o, and the brake-head is swung around the sleeve until the end of the screw-threaded portion of the hook enters the chamber sufficiently to enable the nut to be screwed thereon. Upon the nut being turned one way or the other the curved hook will be caused to travel therethrough in one direction or the other and the brake-head be adjusted to any desired angular position.

A nut-lock such as indicated at 20 or of any preferred type is utilized to prevent accidental rotary displacement of the nut upon the hook.

What I claim is as follows:

1. The combination with a brake-beam, of a brake-head, a pair of concentric circular parts rotatable one within the other, one of such parts being carried by the beam and the other by the head, a device for adjusting and locking such parts consisting of a member carried by one of the parts concentric to the other part, a movable member carried by the other part and coacting with the first-mentioned member and adapted to move one of the parts and lock the said parts in any predetermined angular position relatively to one another.

2. The combination with a pair of concentric circular parts rotatable one within the other, of a device for adjusting and locking such parts consisting of a hook carried rigidly by one of the parts and presenting a curved portion concentric to the other part, a movable member carried by the other part and coacting with the curved portion of the hook and moving the parts first mentioned and locking the same in any predetermined angular position relatively to the other part.

3. The combination with a pair of concentric circular parts rotatable one within the other, of a device for adjusting and locking such parts consisting of a hook carried rigidly by one of the parts and presenting a curved screw-threaded portion concentric to the other part, a nut located adjacent to and retained against movement by the other part and engaging the curved portion of the hook and moving the parts first mentioned and locking the same in any predetermined angular position relatively to the other part.

4. The combination with a brake-beam having a sleeve mounted thereon, such sleeve having an eccentric hole and the beam having a recess concentric to the said hole, a hook presenting a straight portion and a screw-threaded curved portion, the straight portion being located in the hole and coinciding recess and the curved portion extending concentric to the sleeve, a brake-head having a cylindrical portion fitting rotatably upon the sleeve with the curved portion of the hook projecting through a slot therein and presenting a chamber with openings in circumferential line with and accommodating the curved portion of the hook, a nut in the chamber and having the curved portion of the hook threaded therethrough, and means retaining the hook against displacement relatively to the sleeve.

5. The combination with a brake-beam having a sleeve mounted thereon, such sleeve having an eccentric hole and the beam having a recess concentric to the said hole, a hook presenting a straight portion and a screw-threaded curved portion, the straight portion having a transverse pin-hole and being located in the hole and coinciding recess and the curved portion extending concentric to the sleeve, a brake-head having a cylindrical portion fitting rotatably upon the sleeve with the curved portion of the hook projecting through a slot therein and presenting a chamber with openings in circumferential line with and accommodating the curved portion of the hook, a nut in the chamber and having the curved portion of the hook threaded therethrough, and the cylindrical portion of the head having a slot adjacent to the first-mentioned slot and the sleeve having a recess in its perimeter corresponding to and adapted to coincide with the last-mentioned slot when the hook is out of operative engagement with the nut and such sleeve also having a radial pin-hole communicating at its outer end with the recess and registering at its opposite end with the pin-hole in the hook, and a pair of engaging cotter-pins located in the recess and registering pin-holes for retaining the hook against displacement relatively to the sleeve.

6. The combination with a pair of circular parts concentric to one another and one movable relatively to the other, of a member carried rigidly by one of the parts and presenting a screw-threaded portion concentric thereto such screw-thread being cut away upon the radial inner side of the member, a nut having screwed thereinto the said portion of the member with the mutilated screw-thread, and means retaining the nut against movement in the line of such curved portion of the member.

In testimony whereof I have signed my name to this specification in the presence of two subscribing witnesses.

JOHN ALEXANDER LAMONT.

Witnesses:
 WILLIAM McFEAT,
 FRED. J. SEARS.